United States Patent [19]

Cornwell

[11] Patent Number: 4,670,018

[45] Date of Patent: Jun. 2, 1987

[54] HIGH BTU FUEL ELEMENT

[76] Inventor: James H. Cornwell, 1125 SW. 27th Ave., Boynton Beach, Fla. 33435

[21] Appl. No.: 771,650

[22] Filed: Sep. 3, 1985

[51] Int. Cl.$^4$ .......................... C10L 5/48; C10L 5/32; C10L 5/36

[52] U.S. Cl. .......................................... 44/1 E; 44/6; 44/14; 44/10 B

[58] Field of Search ........................................ 44/4-6, 44/1 E, 10 B, 15 D, 41, 14

[56] References Cited

U.S. PATENT DOCUMENTS

| | | | |
|---|---|---|---|
| 819,218 | 5/1906 | Hartenstein | 44/4 X |
| 1,756,255 | 4/1930 | Meek | 44/4 X |
| 1,924,180 | 8/1933 | Cole | 44/6 |
| 2,016,821 | 10/1935 | Nelms | 44/6 |
| 2,222,945 | 11/1940 | Groll, Jr. et al. | 44/6 |
| 4,040,796 | 8/1977 | Vincent et al. | 44/41 X |
| 4,062,655 | 12/1977 | Brockbank | 44/6 |

FOREIGN PATENT DOCUMENTS 2079782  1/1982  United Kingdom ................ 44/1 E

*Primary Examiner*—Carl F. Dees
*Attorney, Agent, or Firm*—Allegretti, Newitt, Witcoff & McAndrews, Ltd.

[57] ABSTRACT

A fuel element in the form of a log made from highly compressed comminuted cellulose waste e.g. wood and paper, having an external layer of aluminum particles all enclosed in a hard protective shell of matted cellulose fibers. In a preferred form the log has a central bore, the walls of which are also coated with aluminum particles. The log upon burning emits great quantities of heat due to the generation of hydrogen.

7 Claims, 1 Drawing Figure

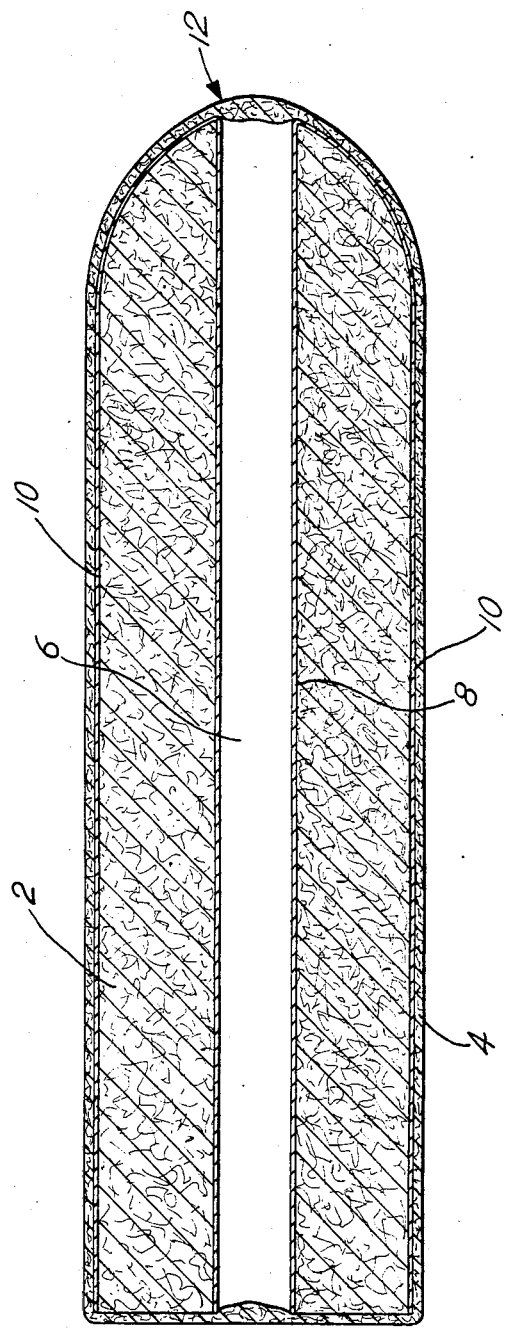

HIGH BTU FUEL ELEMENT

This invention relates to a fuel element in the form of a molded "log" made from waste materials which burns with the evolution of great quantities of heat.

Fuel elements in the form of pellets or logs have been made by converting comminuted wood and municipal waste material to produce a uniform low moisture content element. But such fuels have limited use and are not cost effective. The capital cost for equipment to produce the pellets is high. Costs to ship the fuel to power plants outside the immediate area add still further to the price of the product so that it provides no cost advantage per unit of heat evolved vis-a-vis coal or oil. Usually, it is more economical to burn the waste directly without removing moisture or otherwise processing it in a plant near where the waste originates.

The object of the present invention is to provide a heating element made entirely from waste materials and characterized by extremely high heat to weight ratio.

The heating elements of the invention consist of molded comminuted cellulosic material having a coating of finely divided metal such as aluminum or magnesium. These molded elements are referred to hereinafter as logs since they resemble logs because of their cylindrical shape. Preferably, the metal coated log is enclosed in a shell of hardened matted fibrous materials, such as peat or composted municipal waste to prevent breakage of the logs during handling, as for example, in stacking the logs on pallets for shipment.

The source of the cellulosic material is old paper, cardboard, wood, as in the form of discarded pallets, and similar waste materials that are readily available near the plant where the heating logs are to be made. Aluminum powder is generated in large quantities as a waste product in the manufacture of aluminum disks as the substrate for a magnetic coating used in the memory of computers. The disk must be very smooth. Aluminum powder having a particle size of about 200 mesh is produced in polishing the disks and is considered a hazardous waste under environmental regulations.

The paper, cardboard, wood, and other cellulosic waste is comminuted in a hammer mill, a Bomatic granulator or a similar comminuting device to produce a mixture of paper particles resembling confetti and slivers of wood from $\frac{1}{4}$ to $\frac{3}{8}$ inches long. The comminuted material in the form of a slurry is charged into a vat together with 2% sulfuric or acetic acid where it is agitated at a temperature of 100° F. for about 45 minutes to hydrolize some of the cellulose and gums in the wood. The hydrolyzed materials serve to bind the cellulose particles together during the compressing step of the process. A typical granulated material will contain about 50 parts by weight of paper pulp and about 25 to 30 parts of wood fibers. The relative proportions of these cellulose containing materials are not critical. When the hydrolysis is complete, the acid is neutralized by the addition of calcium hydroxide to bring the pH up to between 6.8 and 7.2. The comminuted material is now in the form of a slurry containing about 20% solids.

The comminuted hydrolyzed waste material is then injection molded into a log shape, that is, a cylinder, preferably with one end rounded or tapered. The molding is done using a screw or a hydraulic piston to force the slurry through an orifice into a jacketed two piece mold under 50 tons of force. The mold is maintained at a temperature of 110° F. The cavity is about $4\frac{1}{2}$ inches in diameter and from 10 inches to 16 inches long, one end being rounded. At this high pressure, the particles are bonded together and water is expelled from the comminuted mass through a port in the wall of the mold which is connected to a source of vacuum. To facilitate release of the molded log, the temperature of the mold is reduced to 55° F. The compressed product has a moisture content of about 35 to 40% by weight.

The compressed logs are then passed through a conventional oven or a microwave oven to drive off additional moisture. The logs are heated for a sufficient length of time to reduce the moisture to 9 to 12% by weight of the total weight of the log. This requires about $7\frac{1}{2}$ minutes using high frequency heating.

The next step in the process is to coat the outside of the log with aluminum metal. The 200 mesh aluminum powder is suspended in a liquid fluorinated hydrocarbon (Freon) in the proportion of about 3 parts of aluminum to one part of hydrocarbon and sprayed on the external surface of the dried compressed log. The coating has a thickness of about 0.125 inches and comprises from 6 to 7% by weight of the finished log. The ratio of aluminum to water in the finished product is critical and will range from 1.5:1 to 3:1. If the quantity of water is excessive the reaction with aluminum will proceed too quickly with the evolution of large quantities of explosive hydrogen.

In a preferred construction, a longitudinal bore is drilled on the center line of the log and the interior wall of the bore is sprayed with aluminum particles from the same slurry mentioned above.

To prevent the aluminum coating and the surface particles of the log from abrading off during further handling, a compacted fibrous skin forming material is sprayed over the entire external surface of the log, as for example, an aqueous slurry of comminuted peat or fibrous composted municipal waste containing about 80% solids. This material is then dried in a microwave oven to about 3% water whereupon it forms a hard shell of matted fibers encasing the log. The skin is also sprayed over the bore in the log.

Promptly after this last drying step, the logs are placed on a pallet or in a suitable shipping container and shrink wrapped in plastic to prevent the hydroscopic cellulosic material from absorbing water from the air. As indicated above, the proportion of water to aluminum is critical since the proportions determine the rate at which the aluminum oxidizes during combustion of the logs.

In the drawing the compressed mixture of comminuted wood and comminuted paper comprising the body of the log is indicated by the numeral 2. The wall of the central bore 6 is spray-coated with a layer of aluminum 8. The entire external surface of the body of the element is coated in like manner with a thin layer 10 of aluminum about 0.125 inches thick. Over the entire outer surface of the log, there is a dried layer of matted fibers 4 which are stiff and hard to protect the aluminum layer and the outer surface of the body from being abraded. It will be noted that the nose of the body is rounded or tapered as indicated at 12. When the logs are burned in a furnace or boiler, they are placed nose down where the air coming into the furnace can circulate readily around the nose and be uniformly distributed.

The external shell 4 ignites quickly. This material will emit about 10,144 BTU's per pound. As the heat is conducted to the interior of the log, the volatile constituents of the ligno-cellulosic materials evolve, as well as water. The water, of course, is converted to steam. The steam passes toward the bore and the external surface of the log and comes into contact with the aluminum where it reacts to produce hydrogen in accordance with the following reaction:

$$2Al + 2H_2O \rightarrow 2AlOH + H_2$$

The hydrogen generated in this reaction then burns to emit a large quantity of thermal energy in accordance with the following reaction:

$$2H_2 + O_2 \rightarrow 2H_2O + \Delta$$

The exothermic heat of this reaction amounts to 60,958 BTU's per pound of hydrogen. The water formed reacts with additional aluminum producing more hydrogen, until all of the aluminum has been reacted.

In the next step of thermal decomposition the cellulosic material pyrolyzes to form a char which burns relatively slowly to provide even heat in accordance with the following equation:

$$C + O_2 \rightarrow CO_2 + \Delta$$

The exothermic heat of reaction amounts to 9192 BTU per pound of carbon.

A log of the kind shown in the drawing 4½ inches in diameter and 10 inches long will weigh about two pounds and burns with the evolution of about 90,000 BTU A similar heating element without the aluminum will burn with the evolution of about 18,000 BTU Thus, the construction of the invention produces five times as much heat energy per pound as the prior art fuel elements.

As indicated, the water to aluminum ratio is critical. It is desirable to generate and burn the hydrogen in a controlled manner. If the water is excessive, a large volume of hydrogen will be generated and burned instantaneously, perhaps resulting in an explosion. On the other hand, if there is not sufficient moisture to react with all of the aluminum, less than the maximum amount of heat will be generated.

What is claimed is:

1. A molded fuel element having an elongated body comprising compacted comminuted cellulose waste and water and a thin layer of finely divided aluminum on the surface of said body for reaction with the water to form hydrogen when the element is burned, the weight ratio of aluminum to water ranging from 1.5:1 to 3:1.

2. The fuel element of claim 1 which is enclosed in a hard protective shell of matted cellulose fibers.

3. The fuel element of claim 1 in which said comminuted waste comprises wood and paper.

4. The fuel element of claim 2 in which the fibers in the protective shell contain peat.

5. The fuel element of claim 1 in which said cellulose waste contains about 50% paper pulp and 25 to 30% wood fibers based upon the total weight of the fuel element.

6. The fuel element of claim 1 which has a longitudinal bore, the walls of which are also coated with finely divided aluminum.

7. The fuel element of claim 6 in which the ends of the bore are closed off with a hard protective shell of matted cellulose fibers.

* * * * *